(12) United States Patent
Chen et al.

(10) Patent No.: US 6,301,521 B1
(45) Date of Patent: Oct. 9, 2001

(54) METHOD AND APPARATUS FOR BOIL PHASE DETERMINATION

(75) Inventors: Yo-To Chen, Niskayuna; Pierino Gianni Bonanni, Clifton Park, both of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/211,161

(22) Filed: Dec. 14, 1998

(51) Int. Cl.[7] ....................................................... G06F 19/00
(52) U.S. Cl. ............................... 700/207; 374/16; 706/47
(58) Field of Search ......................... 700/207; 126/374.1; 219/483, 494, 450; 236/20 A; 374/16–27; 706/47

(56) References Cited

U.S. PATENT DOCUMENTS

| | | |
|---|---|---|
| 2,757,869 | 8/1956 | Ray . |
| 4,465,228 * | 8/1984 | Mori et al. ........................ 236/20 A |
| 4,484,823 * | 11/1984 | Peuker .................................... 374/27 |
| 4,493,980 | 1/1985 | Payne et al. . |
| 4,665,292 * | 5/1987 | Payne .................................... 219/450 |
| 4,788,398 * | 11/1988 | Hornung ............................... 219/483 |
| 4,869,233 | 9/1989 | Stulen et al. . |
| 4,962,299 | 10/1990 | Duborper et al. . |
| 5,067,474 | 11/1991 | Chi . |
| 5,450,305 * | 9/1995 | Boys et al. ............................. 363/24 |
| 5,639,023 * | 6/1997 | Hild et al. ........................... 236/20 A |
| 5,785,425 * | 7/1998 | Buchanen .............................. 374/16 |
| 5,814,721 * | 9/1998 | Mills .................................... 73/53.01 |
| 5,889,264 * | 3/1999 | Kidbald et al. ....................... 219/707 |
| 5,947,370 * | 9/1999 | Rona er al. ......................... 236/20 A |
| 6,118,104 * | 9/2000 | Berkcan et al. ...................... 219/494 |

FOREIGN PATENT DOCUMENTS 2143053A    5/1983    (GB) .

* cited by examiner

*Primary Examiner*—William Grant
*Assistant Examiner*—Ronald D. Hartman, Jr.
(74) *Attorney, Agent, or Firm*—David C. Goldman; Jill M. Breedlove

(57) ABSTRACT

The invention provides an indication of boil phase, such as during cooking. In one embodiment, a boil phase determination system is used in connection with a range heater during heating of a liquid. Sensors, which may include a timer, acoustic sensors, optical sensors, and such or temperature sensors, measure certain parameter values during the heating process. The sensors in turn provide output readings to a processor. The processor is operative for determining a boil phase based on the sensor information. The processor may derive and/or store boil phase relationships, for example, based on the operation of an induction tool with respect to test data. Upon making the boil phase determination, the processor provides an output indicative of the determined boil phase. The output may be used to notify a user of a boil phase such as by sounding an alarm or providing a visual output. The boil phase determination may also be used to operate a controller to thereby control operation of the range heater.

27 Claims, 15 Drawing Sheets

TESTED 825, ERRORS 26 (3.2%)

|     | (a) | (b) | (c) | (d) | (e) | <-classified as |
|-----|-----|-----|-----|-----|-----|-----------------|
|     | 215 | 2   |     |     |     | (a): class      |
|     | 10  | 305 |     |     |     | (b): class      |
|     |     | 4   | 1   |     |     | (c): class      |
|     |     | 3   | 78  | 1   |     | (d): class      |
|     |     | 3   |     | 68  |     |                 |
|     |     |     |     | 2   | 133 | (e): class      |

⎫ 1300

TESTED 825, ERRORS 70 (8.5%)

|     | (a) | (b) | (c) | (d) | (e) | <-classified as |
|-----|-----|-----|-----|-----|-----|-----------------|
|     | 158 | 18  |     |     |     | (a): class      |
|     | 16  | 327 | 5   |     |     | (b): class      |
|     |     | 10  | 72  | 8   |     | (c): class      |
|     |     | 2   | 2   | 83  | 2   | (d): class      |
|     |     | 1   |     | 6   | 115 | (e): class      |

METHOD AND APPARATUS FOR BOIL PHASE DETERMINATION

BACKGROUND OF THE INVENTION

The present invention is generally directed to controls for ranges or other appliances for heating fluids and, in particular, to a method and apparatus for boil phase determination for use in connection with such appliances.

Boiling water or other fluids or foods (generically "liquids") is one of the most common uses of a range. It is typically desirable to closely monitor the boil phase of the liquid during such processes, i.e., to identify the pre-simmer, simmer onset, simmer and/or boil phases. In this regard, the pre-simmer phase is generally characterized by a calm liquid and the simmer onset phase is the initial, slow bubbling of the liquid characterized by the appearance of individual bubbles. During the simmer phase, bubbles appear in jets creating the effect commonly referred to as simmering. Finally, in the boil phase, the bubbling of the liquid is generalized, resulting in the familiar turbulence of a boiling liquid. These phases are easily identified by experts and experienced cooks.

The boil phase is monitored for a number of reasons. First, many cooking processes require that the liquid be attended to upon identification of a particular boil phase, e.g., reducing the heat after the liquid reaches a boil. In addition, the boil phase may be monitored to reduce heat upon boiling so as to prevent boil-over which can result in a burned-on mess or, in the case of gas ranges, extermination of the cooking flame. Moreover, a liquid not monitored upon boiling can boil dry resulting in burning of the food and a mess as well as presenting a potential hazard.

Generally, the boil phase is monitored visually. This is tedious, hence the common expression "watched water never boils." Such visual monitoring can interfere with the user's ability to prepare other foods or be otherwise fully productively disposed during heating of the liquid. Moreover, a busy or inexperienced cook may fail to accurately and in a timely manner identify a boil phase of interest. Accordingly, it would be beneficial to automatically monitor the boil phase of a liquid in order to provide greater convenience, cooking consistency and safety.

SUMMARY OF THE INVENTION

According to one aspect of the present invention, a method is provided for correlating boil phase to an identifiable characteristic of one or more detectable boil-related parameters. Such parameters can include any parameter or combination thereof that is measured by a sensor system and provides an indication of boil phase. Examples include time, temperature, sound and light-based/optical phenomena. The correlation method involves performing a number of test runs where output from a sensor is received for relation to a boil phase as determined visually. The method further involves determining a relationship between the received sensor output and boil phase and storing information regarding the relationship for use in determining boil phase during subsequent liquid heating processes. Preferably, the step of determining a relationship involves a feature extraction substep and an induction tool substep. In the feature extraction substep, the sensor output is sampled and analyzed mathematically to identify sensor reading characteristics that may be related to boil phase. In the induction tool substep, an induction tool is applied relative to the identified sensor reading characteristics to inductively develop operating rules relating sensor output to boil phase.

According to another aspect of the present invention, an apparatus is provided for determining boil phase such as during cooking. The apparatus includes a sensor system for sensing a state relative to a liquid under consideration, a processor for receiving signals from the sensor system regarding the state of the liquid and making a determination regarding boil phase based on the received signal, and an output system for providing an output indicative of the determined boil phase. The sensor system preferably includes one or more of a timer, a temperature sensor, an acoustic sensor and an optical sensor (e.g., to identify bubbling of the fluid, to determine the size and type of pan or other container, whether the container has a lid or any other optically detectable parameter). In one embodiment, the processor stores inductively derived rules relating sensor output to boil phase and makes a comparison of the sensor system output to the rules to determine boil phase. The output may be provided in any of various forms. For example, the user may be notified of a boil phase of interest by an indicator, e.g., a visual output such as via a light or LED display or an audible signal such as a bell, buzzer, or the like. Alternatively or additionally, an electronic output may be provided such as via a feedback signal transmitted to a controller so as to automatically reduce or cut off heating of the liquid. A corresponding method for determining boil phase involves obtaining sensor reading information regarding a state of the fluid, conducting a comparison between stored relationship information concerning a relationship between sensor reading at boil phase and providing an output based on the comparison, where the output provides an indication of boil phase based on the stored relationship information.

BRIEF DESCRIPTION OF THE DRAWINGS

For a more complete understanding of the present invention, and further advantages thereof, reference is now made to the following detailed description, taken in conjunction with the drawings, in which:

FIG. 13 is a table summarizing boil phase classification results obtained in accordance with the present invention.

DETAILED DESCRIPTION

Figure 1:
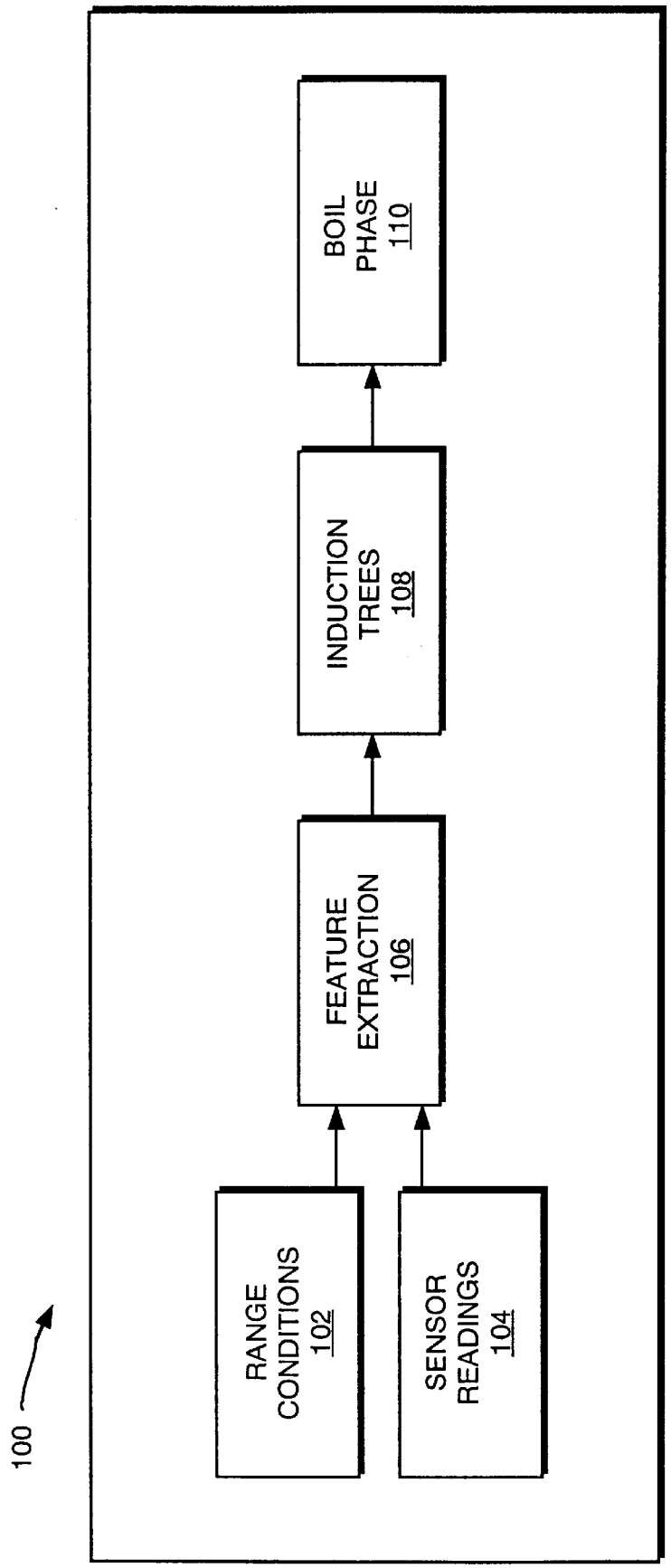
FIG. 1 is a schematic diagram of a process for boil phase determination in accordance with the present invention.

FIG. 1 is a schematic diagram of a boil phase determination system 100 in accordance with the present invention. In particular, the illustrated system 100 makes a determination regarding boil phase 110 based on certain inputs. As shown, the inputs include range conditions 102 and sensor readings 104. The range conditions may include a number of operating conditions or constants that are relevant to making the boil phase determination, operating the range in response to the boil phase determination or otherwise important for range operation. Such range conditions may include, for example, the power level of the range heater, the food (liquid) type, load size, pan type, pan size, pan cover and other inputs. As will be understood from the description below, the heater power level may be useful in connection with controlling the power level to prevent boil over based on the boil phase determination. Other range condition inputs such as pan type and presence of a pan cover may be useful in determining boil phase. Still other range condition inputs, such as pan size, may be used for multiple purposes such as determining boil phase and selectively deactivating unnecessary coils (e.g., the outer coil) for improved efficiency. Upon consideration of the description below, it will be appreciated that not all such range condition inputs are required, and the system 100 can function with a few or no such range condition inputs. In addition, in order to provide a system that is convenient in operation, it is desirable that as many inputs as possible be determined automatically without requiring significant manual input by the user. Accordingly, many of these inputs such as load size, pan type, pan size, pan cover, etc., are preferably determined based on outputs from optical sensors, strain gauges or the like.

The sensor readings 104 provide measurements of boil-phase related parameters that change during heating of the liquid to provide an indication of boil phase. Any appropriate parameters may be measured in accordance with the present invention. A number of such parameters are detailed below including time, temperature, sound and derivatives thereof. Other parameters that may be utilized include optical sensor readings and derivatives thereof. Accordingly, the sensor readings may comprise the raw outputs from timers, temperature sensors, acoustic sensors, optical sensors or any other appropriate sensors.

The range conditions 102 and sensor readings 104 are received by a feature extraction module 106 that extracts useful information from the raw input information and compresses the data into a manageable size. In this regard, the sensor readings of the illustrated embodiment are recorded as a time series of data for a cooking cycle. In the feature extraction module 106, the time series may be segmented into blocks of data. A linear moving averaging filter can then be applied to each block of data such that a data point is obtained as the output from the filter thereby compressing the data. As will be understood from the description below, a column vector relative to a particular parameter is thereby generated based on a time series of data for a particular heating process. The module 106 can be implemented in software and/or hardware. In a preferred implementation of the present invention as set forth below, such information regarding a number of parameters can be used to construct a feature matrix useful for identifying particular sensor reading characteristics that may correlate to boil phase determinations of interest.

The output from the feature extraction module 106 is received by the induction trees module 108 which is capable of analyzing the input data to derive rules relating sensor reading data to boil phase conditions and/or to apply such rules to input data so as to make a boil phase determination. In this regard, an induction tool is capable of learning the input-output relationship from training data, i.e., pair-wise sets of input and output information. In the illustrated embodiment, the input is a set of sensor readings while the output is a set of labels indicating the various boil phases; namely, pre-simmer, simmer-onset, simmer and boil. In this manner, an induction tool is used to discover the underlying relationships between sensor readings and the four boil phases. The illustrated module 108 may be implemented as software and/or hardware logic. The various components of the system 100 will be more fully understood upon consideration of the examples that is follow.

Figure 2:
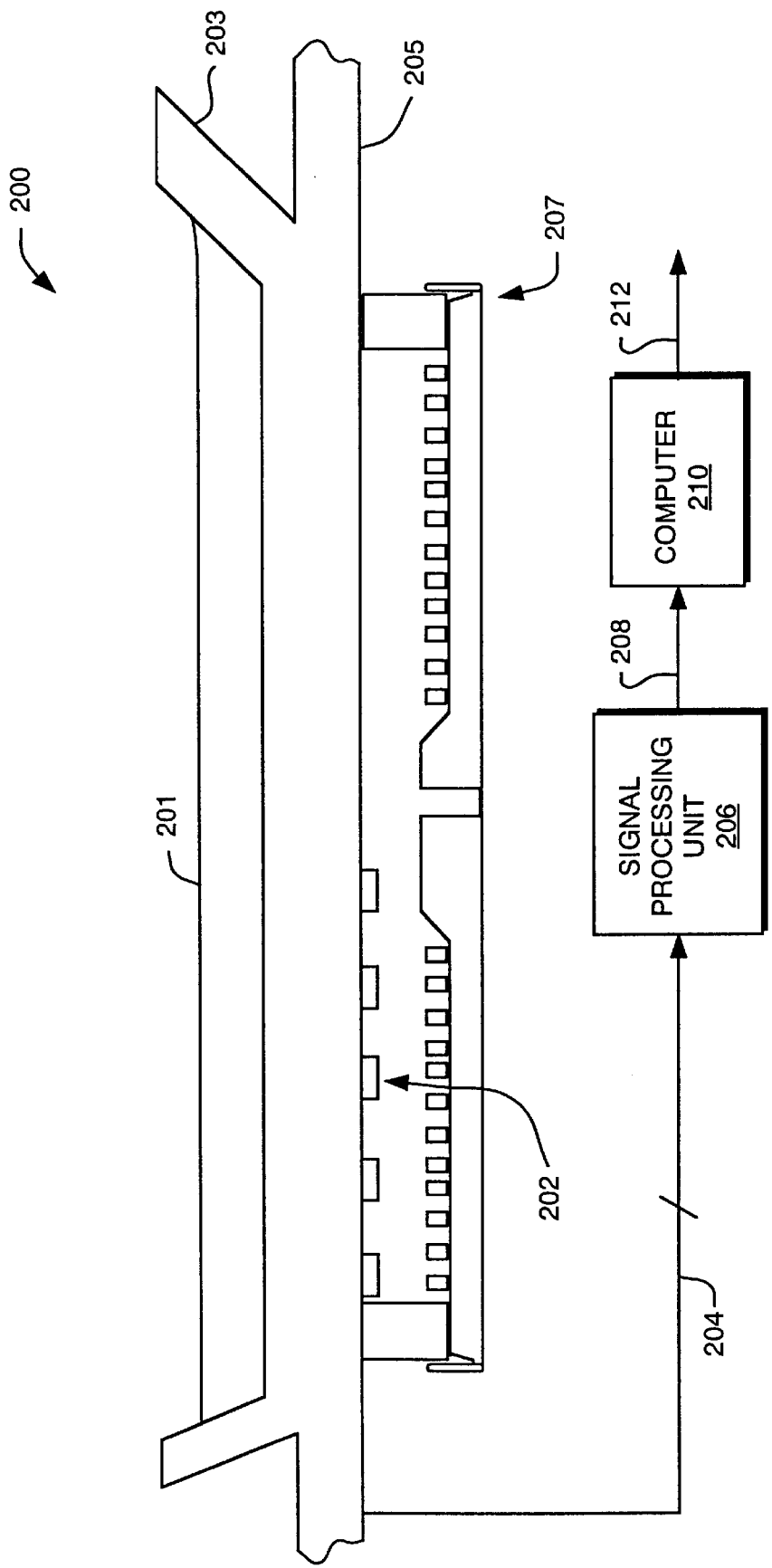
FIG. 2 is a partially schematic diagram illustrating a temperature-based boil phase determination system in accordance with the present invention.
Figure 3:
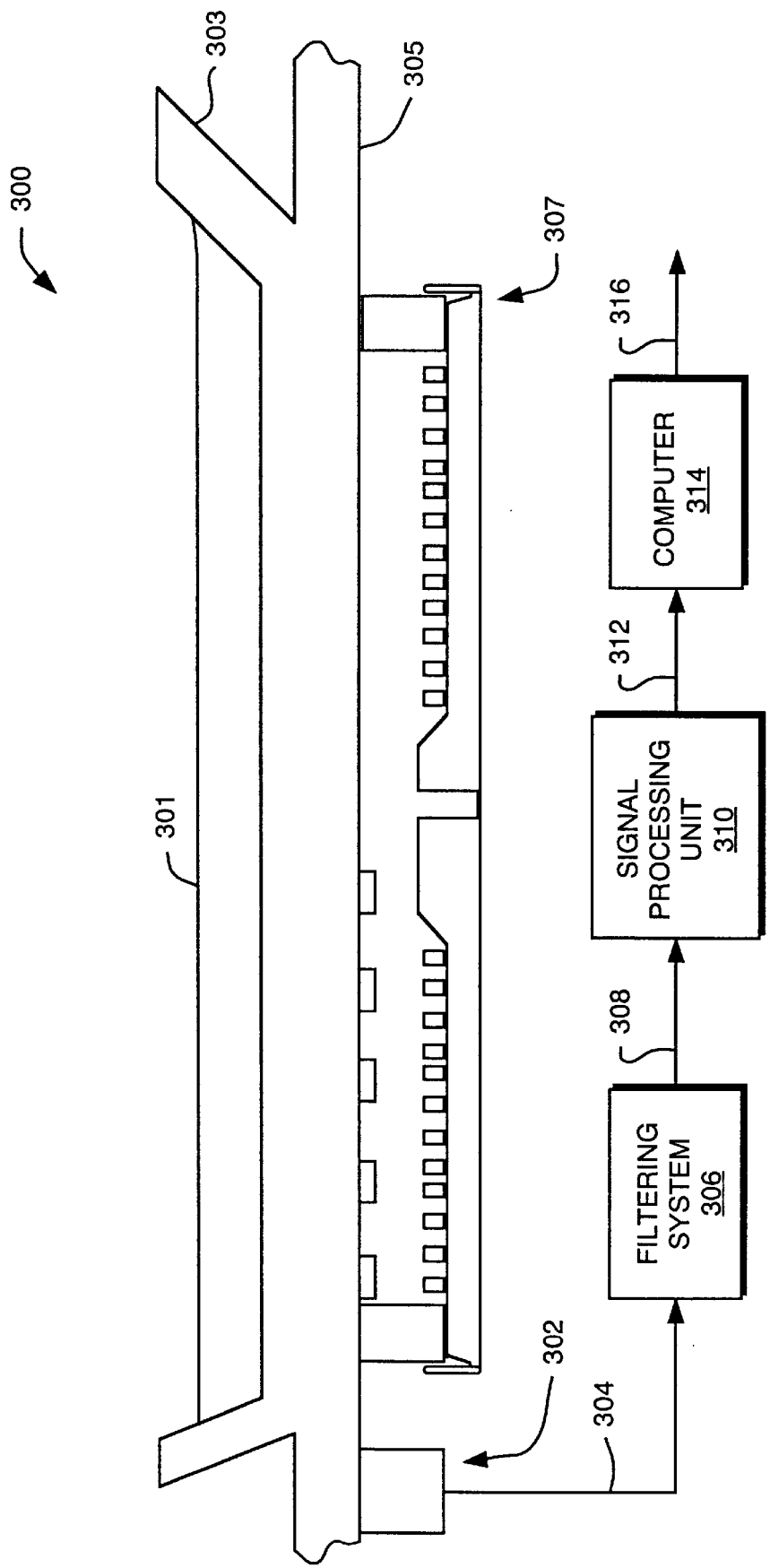
FIG. 3 is a partially schematic diagram illustrating an acoustic-based boil phase determination system in accordance with the present invention.
Figure 14:
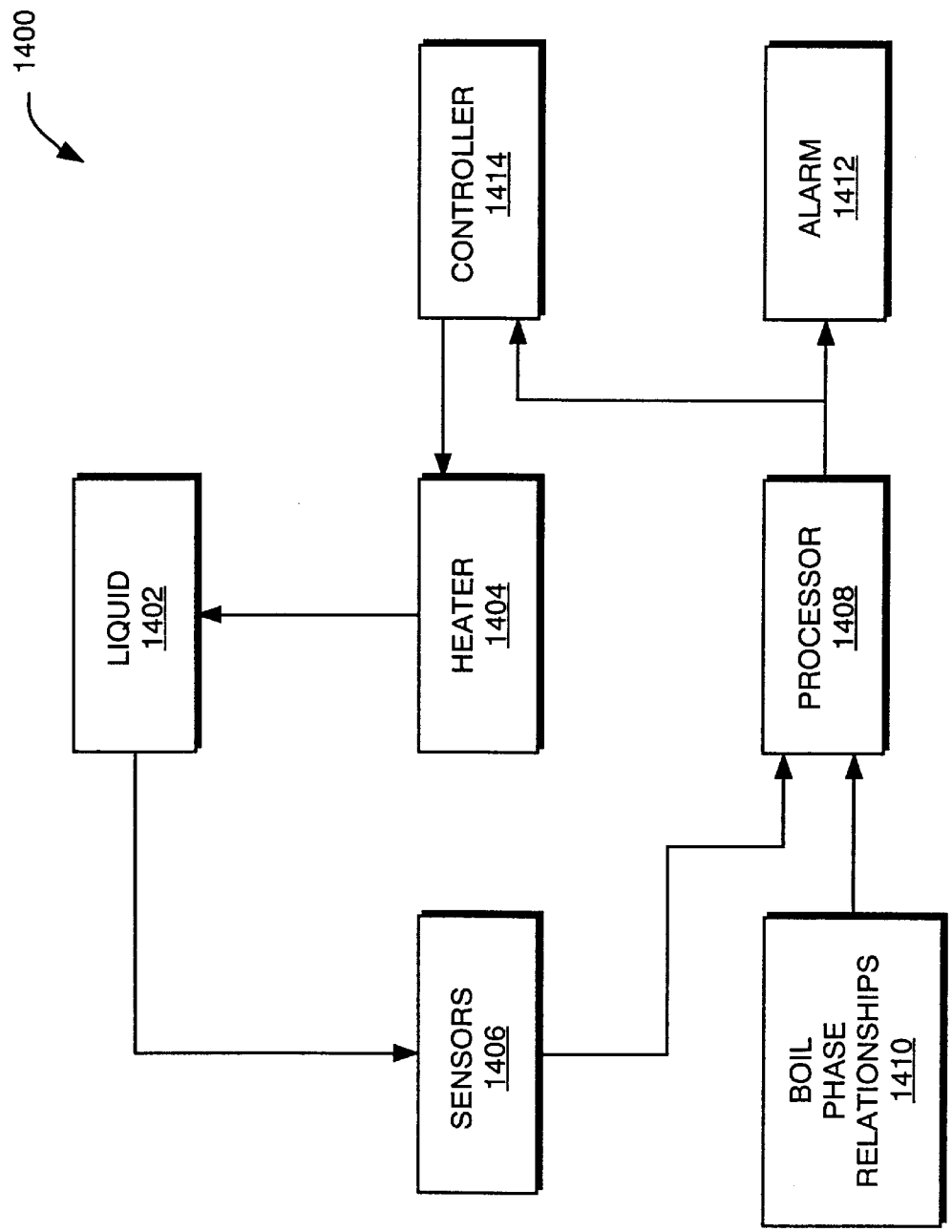
FIG. 14 is a schematic diagram illustrating boil phase determination system in accordance with the present invention.

FIGS. 2–14 relate to specific examples illustrating the use of time, temperature and sound readings to first determine relationships for use in identifying boil phase and then apply these relationships with respect to subsequent heating processes to make boil phase determinations. Specifically, FIGS. 2–3 illustrate boil phase determination system configurations. FIGS. 4–12 illustrate a process for developing boil phase relationships based on a series of 11 test runs. FIG. 13 demonstrates the effectiveness of these determined relationships in predicting or determining boil phase in subsequent heating processes. Finally, FIG. 14 illustrates a system utilizing the boil phase relationships in conjunction with sensor readings to provide boil phase outputs in the context of a range.

Referring to FIG. 2, a temperature based boil phase determination system is generally identified by the reference numeral 200. The system 200 is used in connection with determining the boil phase of a liquid 201 contained in a pan or other container 203 on a glass range top 205. The liquid 201 is heated by a range heater generally identified by reference numeral 207. It will be appreciated that many different types of range heaters may be utilized, including gas and electrical heaters.

The illustrated system 200 includes a number of thermal sensors 202. Any appropriate thermal sensors may be used in this regard including, for example, conventional thermocouples. In the illustrated embodiment, the thermal sensors 202 are mounted on the underside of the glass range top 205. It is possible to derive temperature information for use by the system 200 using only a single thermal sensor 202. In the illustrated embodiment, a number of thermal sensors 202 are provided and are spaced relative to the radii of the heater 207 and container 203. The use of a number of thermal sensors 202 is useful for a variety of purposes. For example, the use of a number of sensors provides more information for possible correlation to boil phase in accordance with the present invention. In addition, the use of multiple sensors in the illustrated configuration may provide an indication of container size for use in boil phase determinations and/or to selectively deactivate portions of the heater 207 (e.g., an outer coil) for improved efficiency.

The thermal sensors 202 provide an output signal 204 that is delivered to a signal processing unit 206. The output signal 204 may be, for example, a time series of information including readings from each of the thermal sensors 202 at regular time intervals during a heating process. The signal processing unit 206 receives this raw data and provides an output 208 suitable for use by a computer 210 in deriving and applying relationships relating to boil phase. Depending on the nature of the signals 204 the functions of the signal processing unit 206 may include, among other things, data compression through the use of averaging filters as discussed above, analog to digital signal conversion and noise reduction/elimination. The computer 210 provides further signal processing, feature extraction and inductive tool processing as will be discussed in detail below. Based on such processing, the computer 210 outputs a boil phase signal 212 providing an indication of boil phase. The signal 212 may be used to, for example, notify a user of a desired boil phase or to control operation of the heater 207 such as to prevent boil over or boil dry. It will be appreciated that the computer 210, which may be embodied in one or more chips, is preferably miniaturized for convenient placement within conventional range housings.

FIG. 3 illustrates an acoustic based boil phase determination system 300. The system 300 is used to determine the boil phase of a liquid 301 in a container 303 on a glass range top 305 that is heated by range heater 307. The system 300 includes one or more acoustic sensors 302. Any suitable acoustic sensors may be utilized such as, for example, piezo sensors that provide a signal proportional to displacement of the range top 305. In the illustrated embodiment, the acoustic sensors 302 are mounted on the underside of the glass range top 305. Although only one acoustic sensor 302 is shown, it will be appreciated that multiple sensors 302 may be utilized to obtain more information, and such sensors 302 may be spaced relative to the radii of the heater 307 and container 303.

The illustrated sensor 302 provides an electrical output signal 304 based on and proportional to received acoustic signals. Such acoustic signals result from, among other things, the generation of bubbles in the liquid 301 incident to simmering or boiling thereof. It will be appreciated that acoustic signals may also be received from a variety of other sources such as stirring of the liquid 301, movement of the container 305 and other ambient sources. Such additional sources of acoustic signals may be considered noise for the purposes of the boil phase determination system 300.

The raw output signal 304 is received by a filtering system 306. Among other things, the filtering system 306 may filter the signal 304 to reduce or eliminate noise. In this regard, the filtering system 306 may include a band pass filter that selectively passes frequency components of the signal 304 that are considered most useful with regard to the desired boil phase determinations. The result is a filtered signal 308. The filtered signal 308 is then received by a signal processing unit 310 that processes the filtered signal 308 to provide an output 312 suitable for use by the computer 314 in making boil phase determinations. Depending on the nature of the sensor 302 and other factors, the signal processing unit 310 may perform, among other functions, data compression as discussed above and analog to digital signal conversion. The computer 314 receives the output 312 and performs further signal processing, feature extraction, inductive tool analysis and other functions as discussed below. Based on such processes, the computer provides an output 316 that can be used, for example, to notify a user of a boil phase of interest or to control the heater 307 such as to reduce or eliminate boil-over and boil-dry.

Figure 4:
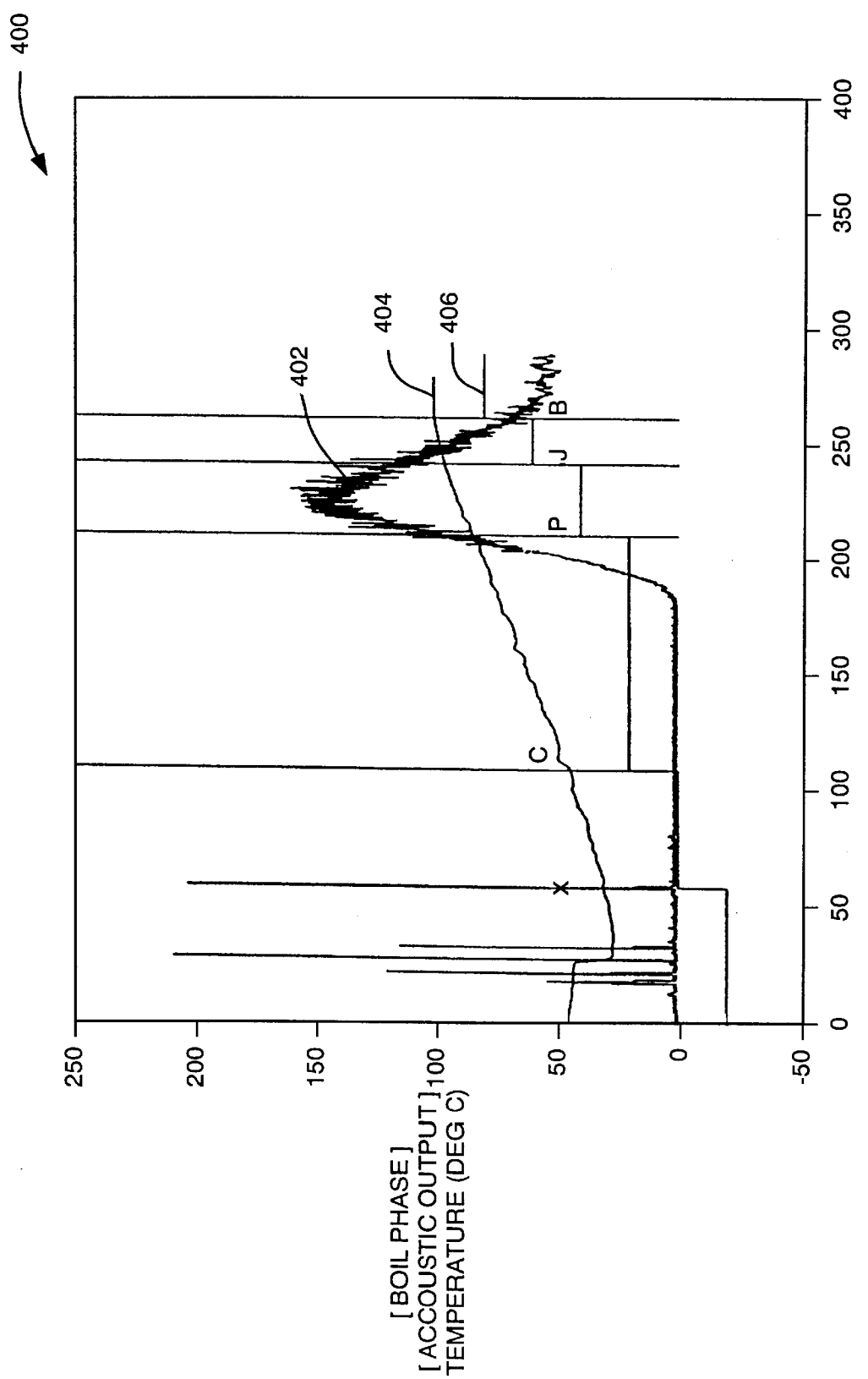
FIG. 4 is a graph illustrating time series plots of boil phase, temperature and acoustic sensors versus time generated in accordance with the present invention.

FIG. 4 is a graph illustrating time series plots of boil phase, temperature, and acoustic sensor output versus time. Generally, the time series corresponds to a test run where a pan of warm water was placed on a range at time t=0. The range burner was then turned on to begin heating the water at about time t=60 corresponding to the location of "x" in the figure. The step function 406 generally indicates boil phase. In this regard, the flat portion of the curve between about t=0 and t=60 indicates slowly cooling water prior to the application of heat. The portion of the function 406 between x (t≅0) and C (t≅110) corresponds to an initial heating phase. The next portion of the function 406 between C (t≅110) and P (t≅210) corresponds to the pre-simmer stage. The portion of the function between P (t≅210) and J (t≅240) corresponds to the simmer onset phase. Next, the portion of the function between J (t≅240) and B (t≅260) corresponds to the simmer phase. Finally, the portion of the curve to the right of B indicates steady state boiling.

The temperature curve 404 shows that the water slowly cools between time t≅0 and time t≅60 where the burner was turned on. After time t≅60 the temperature sensor reading gradually increases to temperature 100° C. corresponding to the boiling temperature of water. The acoustic curve 402 includes a number of interesting characteristics. First, the curve includes a number of spikes between times t≅0 and t≅60. The spikes, which occur prior to turning on the heater, are believed to identify noise associated with the test setup. The acoustic curve 402 also includes a peak generally corresponding to the simmer onset/simmer phase.

Figure 5:
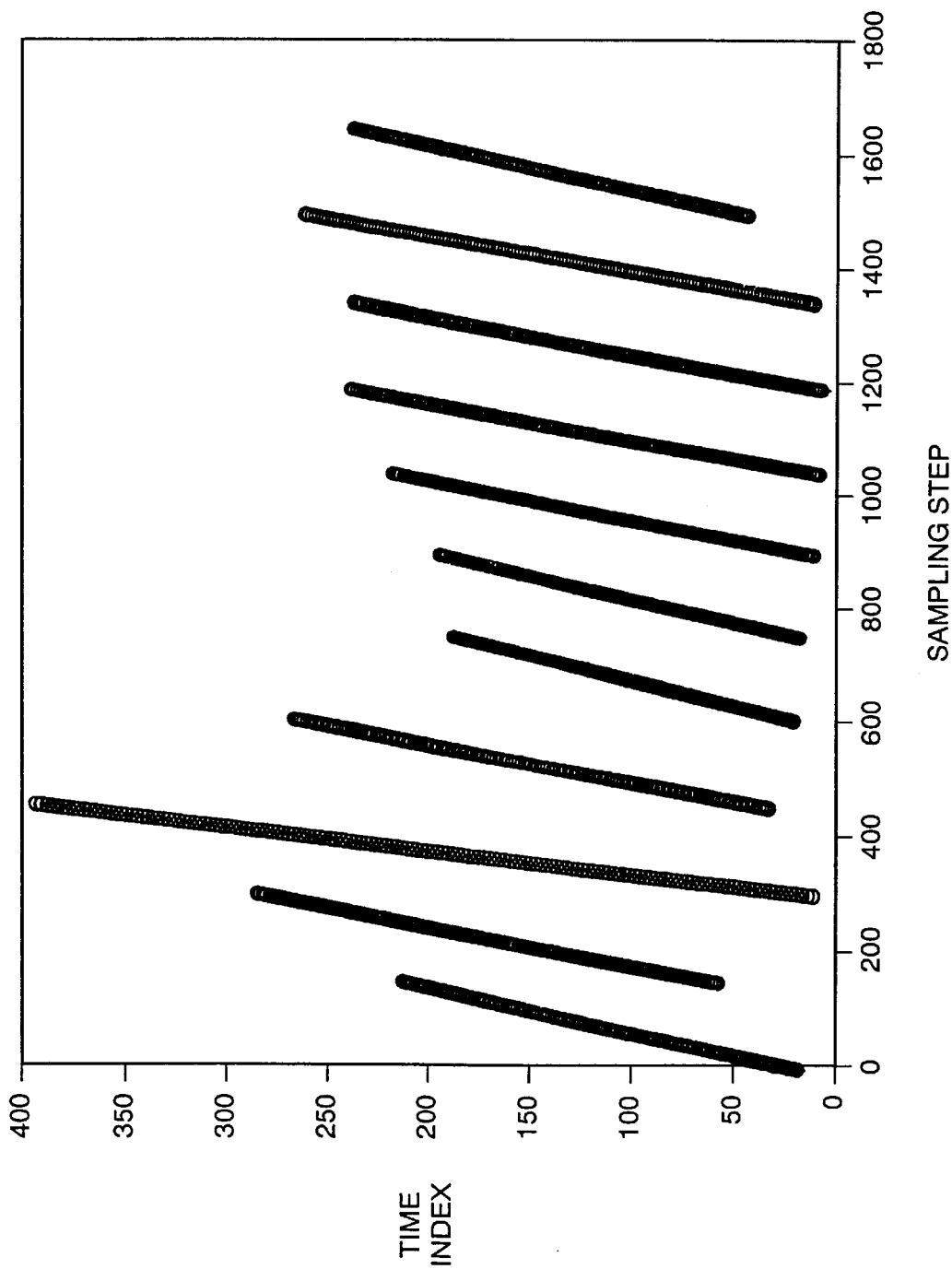
FIG. 5 is a graph illustrating time series plots of timer output for a series of test runs in accordance with the present invention.

FIGS. 5–10 show various sensor outputs for a series of 11 test runs. Referring first to FIG. 5, this figure shows a plot of time index versus sampling step. This figure indicates that the 11 runs correspond to approximately 1600 sampling steps. As the figure indicates, the time index is reset after each test run. Resumption of Sampling then occurs sometime after time index t=0 for each run. The illustrated 11 substantially linear columns of data thus indicate the 11 sampling runs where the circles defining the columns correspond to individual sampling steps. The linear nature of the columns indicates a substantially constant sampling rate within each test run whereas the density or darkness of each column indicates sampling rate which may vary from run to run.

Figure 6:
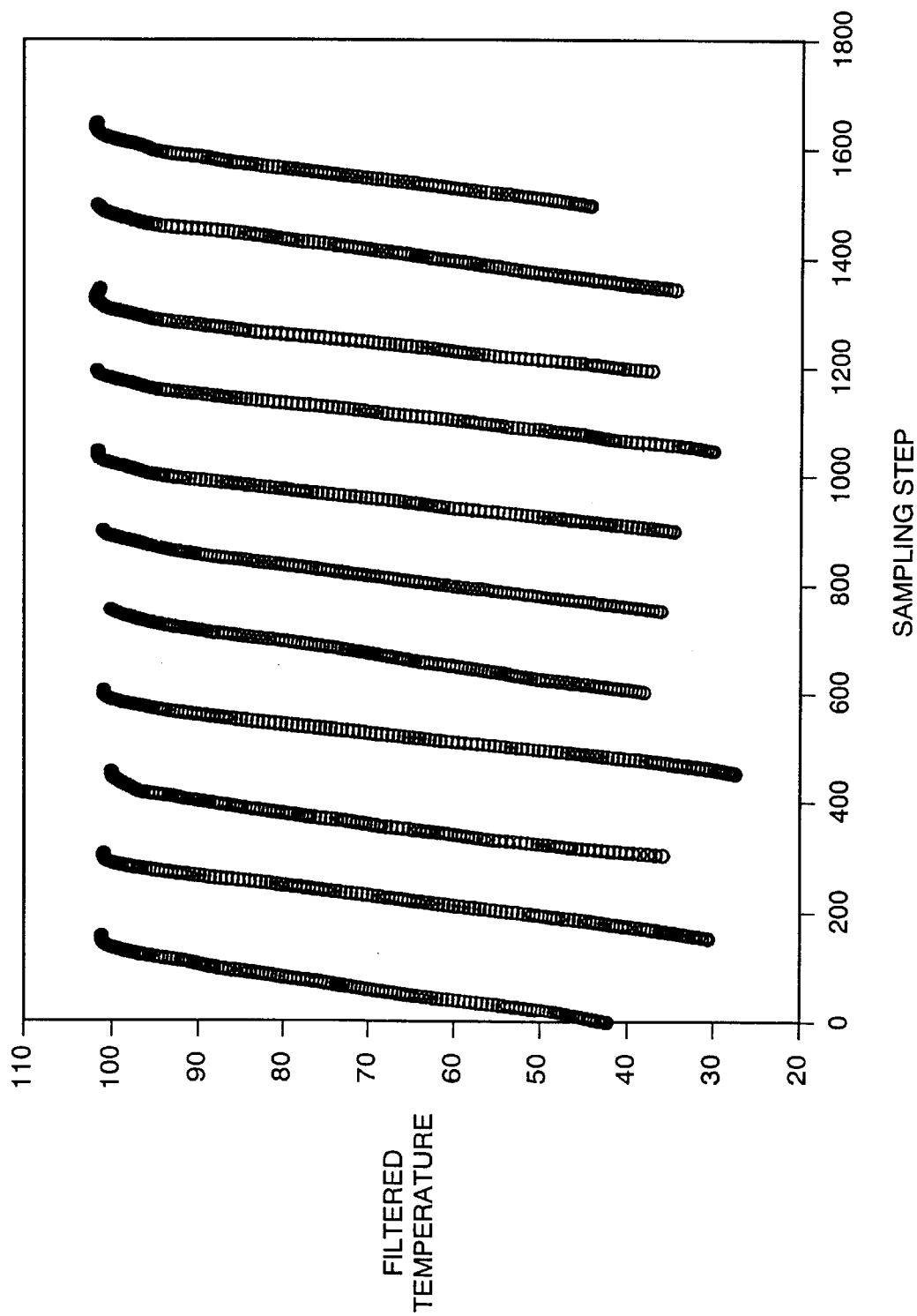
FIG. 6 is a graph illustrating time series plots of a temperature sensor output for a series of test runs in accordance with the present invention.

FIG. 6 illustrates temperature reading versus sampling step for the 11 test runs. In this regard, the temperature readings correspond to a filter temperature obtained using a linear moving averaging filter. As shown, for each run the temperature generally increases in a generally linear fashion until reaching a temperature of near t=100 suggesting that a time derivative of the temperature curve may yield interesting features relative to boil phase.

Figure 7:
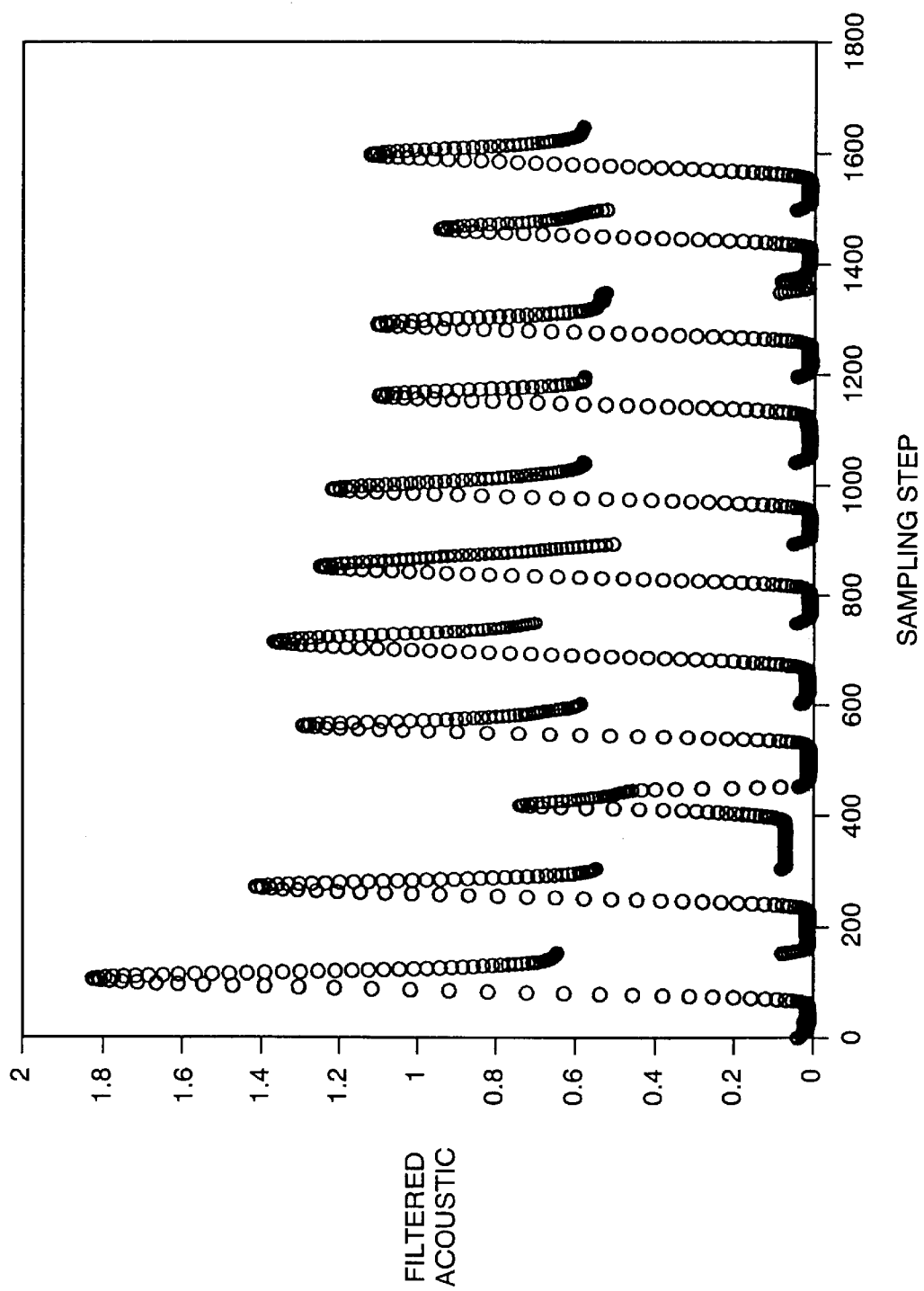
FIG. 7 is a graph illustrating time series plots of an acoustic sensor output for a series of test runs in accordance with the present invention.

FIG. 7 shows a plot of filtered acoustic output versus a sampling step for the 11 runs. The plots for the various test runs are generally similar in shape including a large number of initial sampling steps where the acoustic output is quiet, followed by a rapid rise in the acoustic output, a well defined peak and then a rapid decrease in the acoustic output. Again, this suggests that the filtered acoustic output as well as a time derivative thereof may reveal interesting features correlating to particular boil phases.

Figure 8:
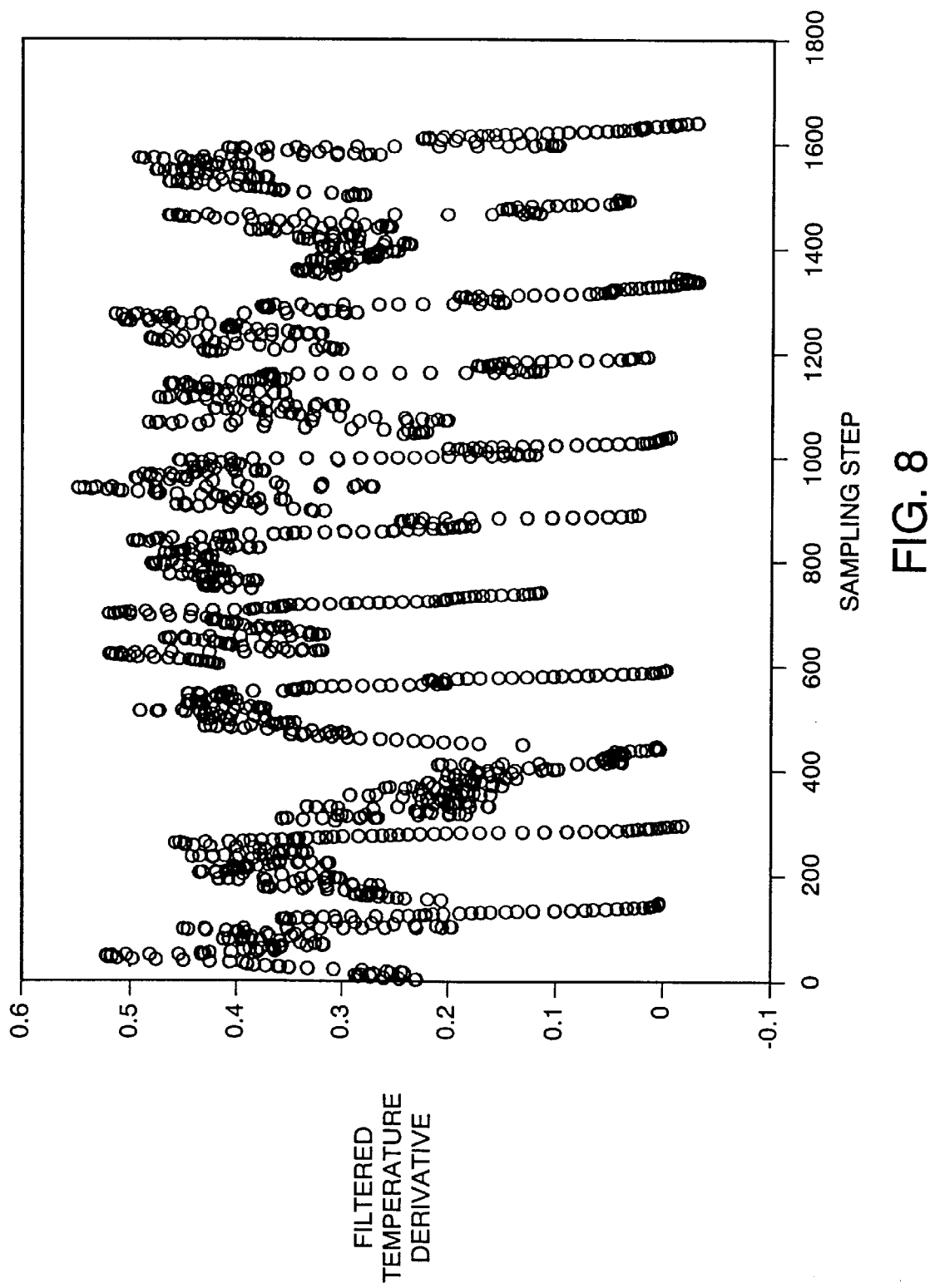
FIG. 8 is a graph illustrating time series plots of temperature derivative for a series of test runs in accordance with the present invention.

FIG. 8 shows a plot of the first time derivative of temperature versus sampling step for the 11 test runs. Upon close observation of FIG. 8, it will be observed that the plot for each test run is characterized by an initial period where the temperature derivative remains greater than 0.1 and generally greater than 0.2, followed by a final period where the temperature derivative rapidly drops off to a value approaching zero corresponding to steady state boiling.

Figure 9:
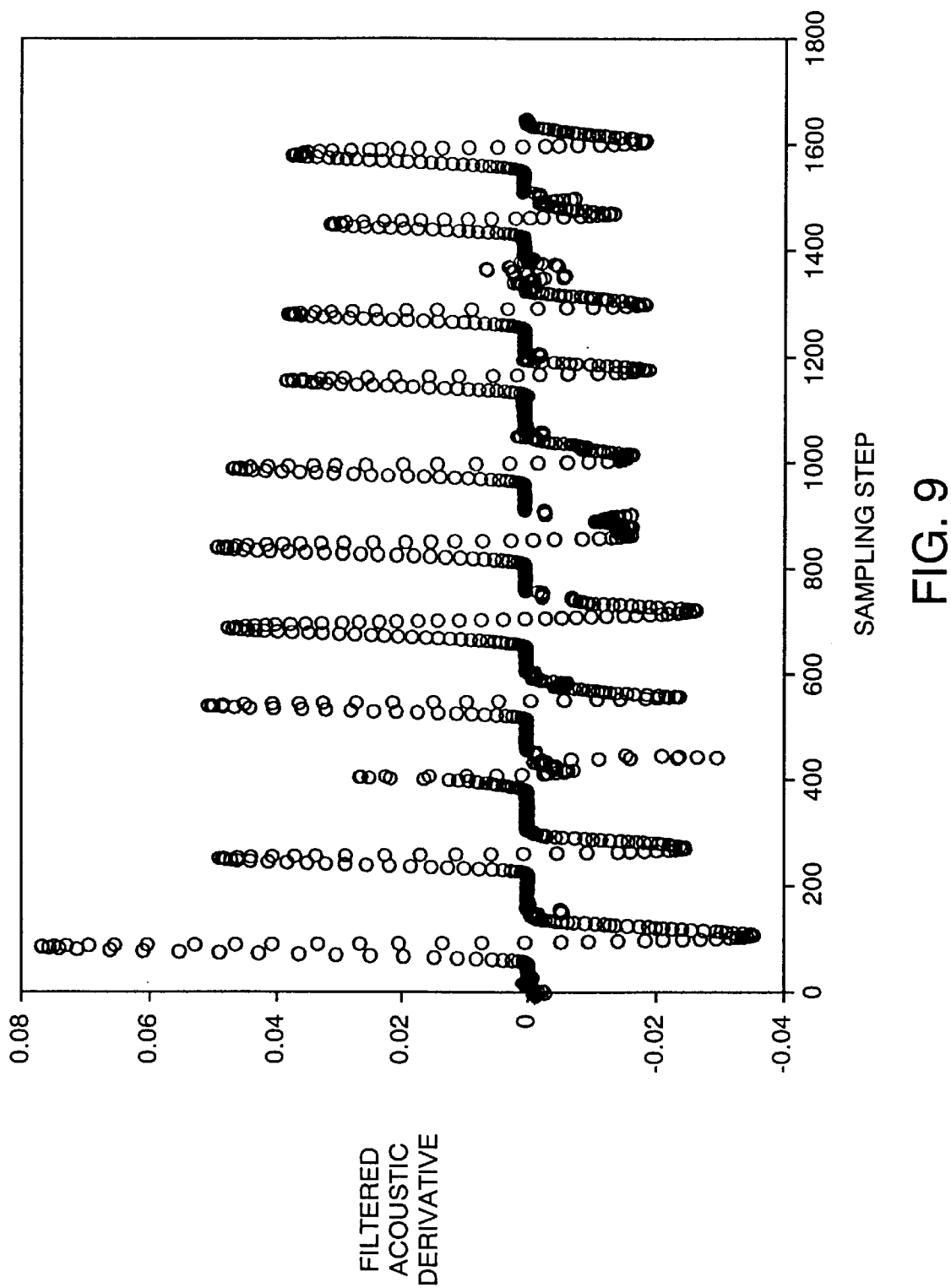
FIG. 9 is a graph illustrating time series plots of acoustic derivative for a series of test runs in accordance with the present invention.

FIG. 9 shows a plot of the first time derivative of the acoustic curve versus sampling step for the 11 runs. Again, the plot corresponding to each of the 11 runs is very similar in shape. In this case, the plot for each run includes an initial period where the derivative remains near to zero, followed by a well defined positive peak, then followed by a well defined negative peak (or trough), after which the plot returns to a value near zero. These well defined peaks again provide interesting candidates for correlation to boil phase.

Figure 10:
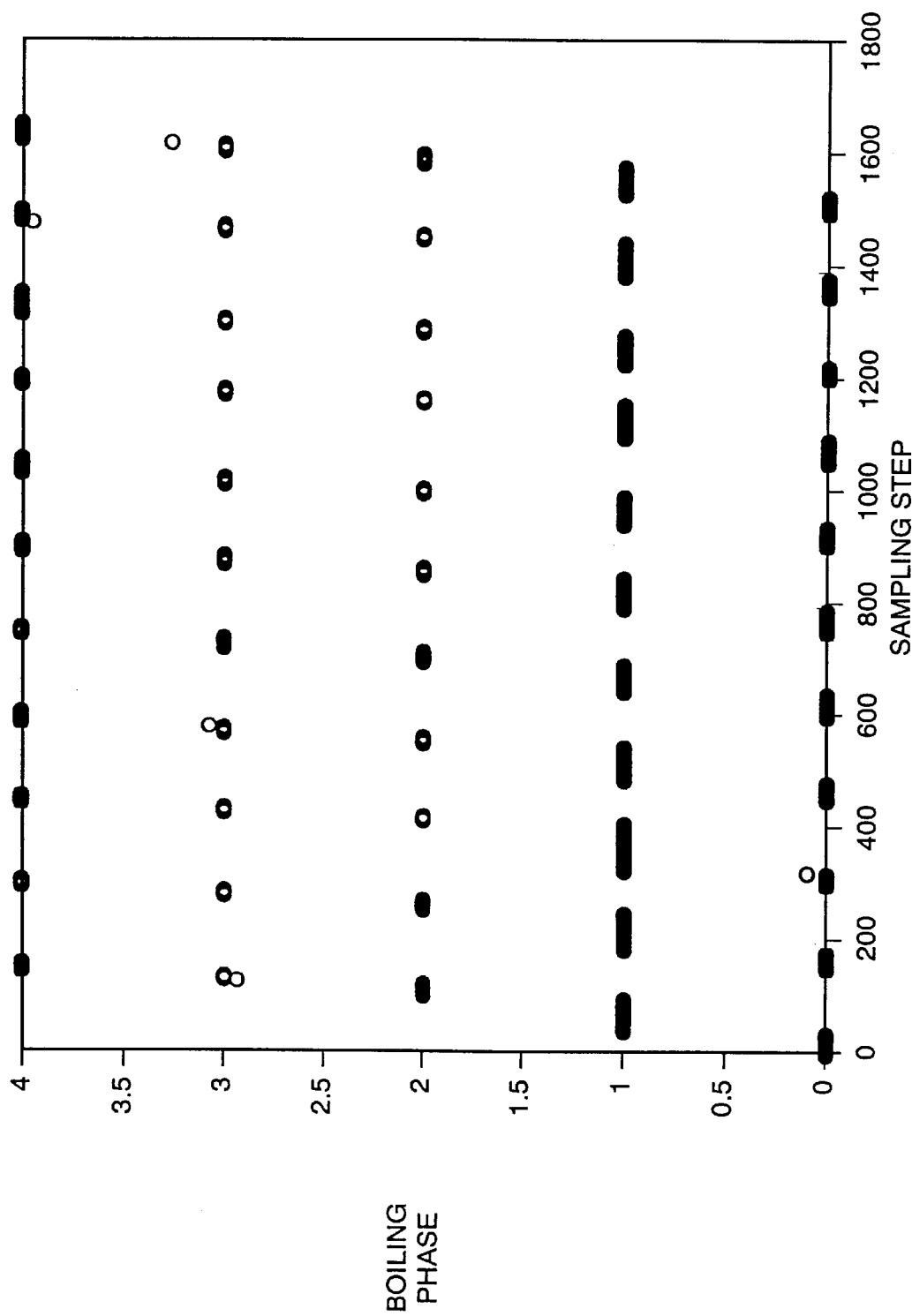
FIG. 10 is a graph illustrating time series plots of boil phase for a series of test runs in accordance with the present invention.

FIG. 10 shows plots of boiling phase versus sampling step for the 11 test runs. In this case, the various boil phases were assigned numerical values. Specifically, value 0 corresponds to a calm liquid during the initial portion of the heating process. The value 1 corresponds to the pre-simmer phase. Simmer onset is identified by the value 2. The simmer phase corresponds to the value 3. Finally, the boiling phase is identified by the value 4. As would be expected, each test run includes the following phases in series: calm, pre-simmer, simmer onset, simmer and boil.

Figure 11A:
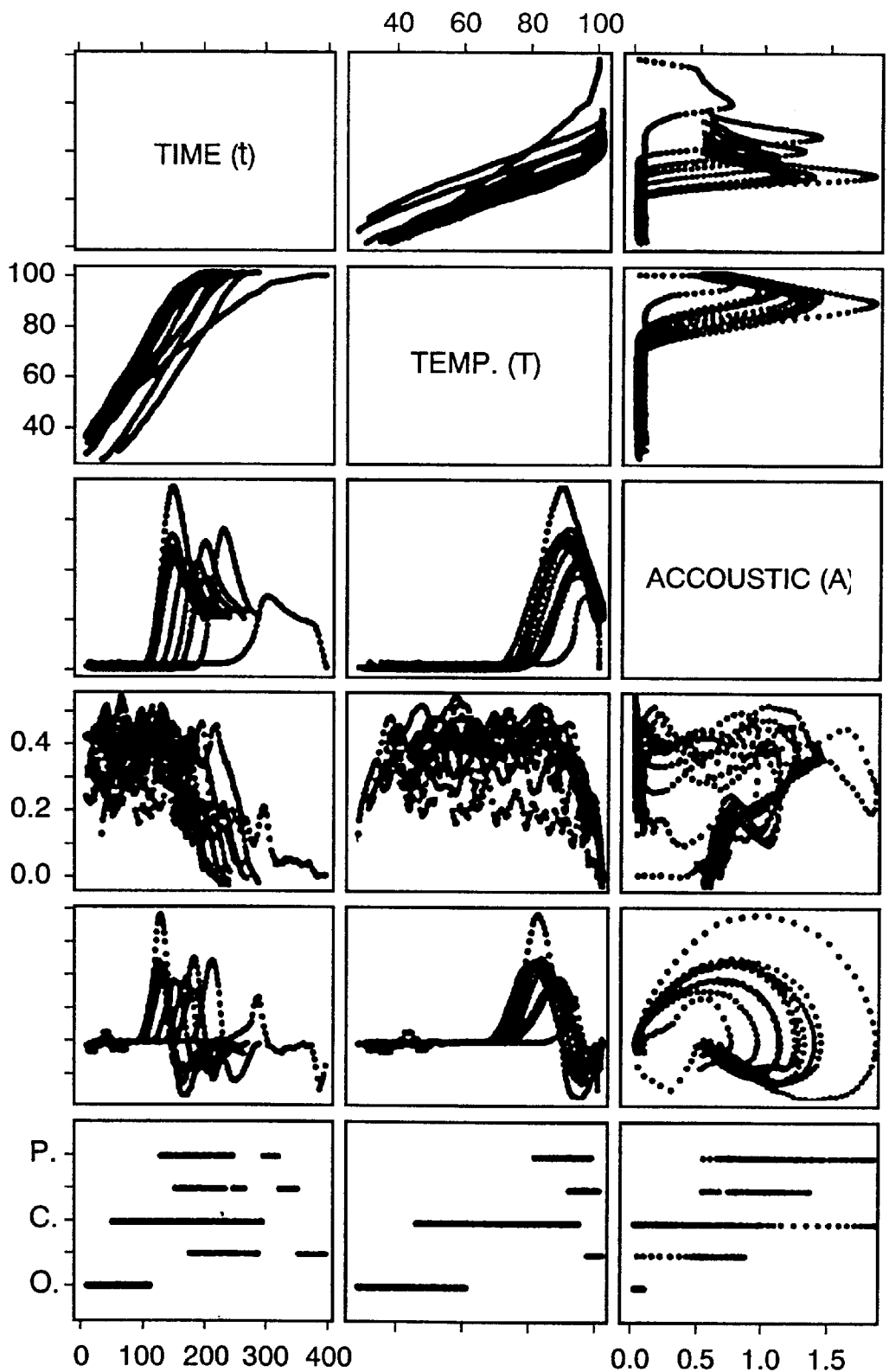
FIG. 11 is a matrix plot of time, temperature, acoustic, temperature derivative, acoustic derivative and boil phase based on a series of test runs in accordance with the present invention.
Figure 11B:
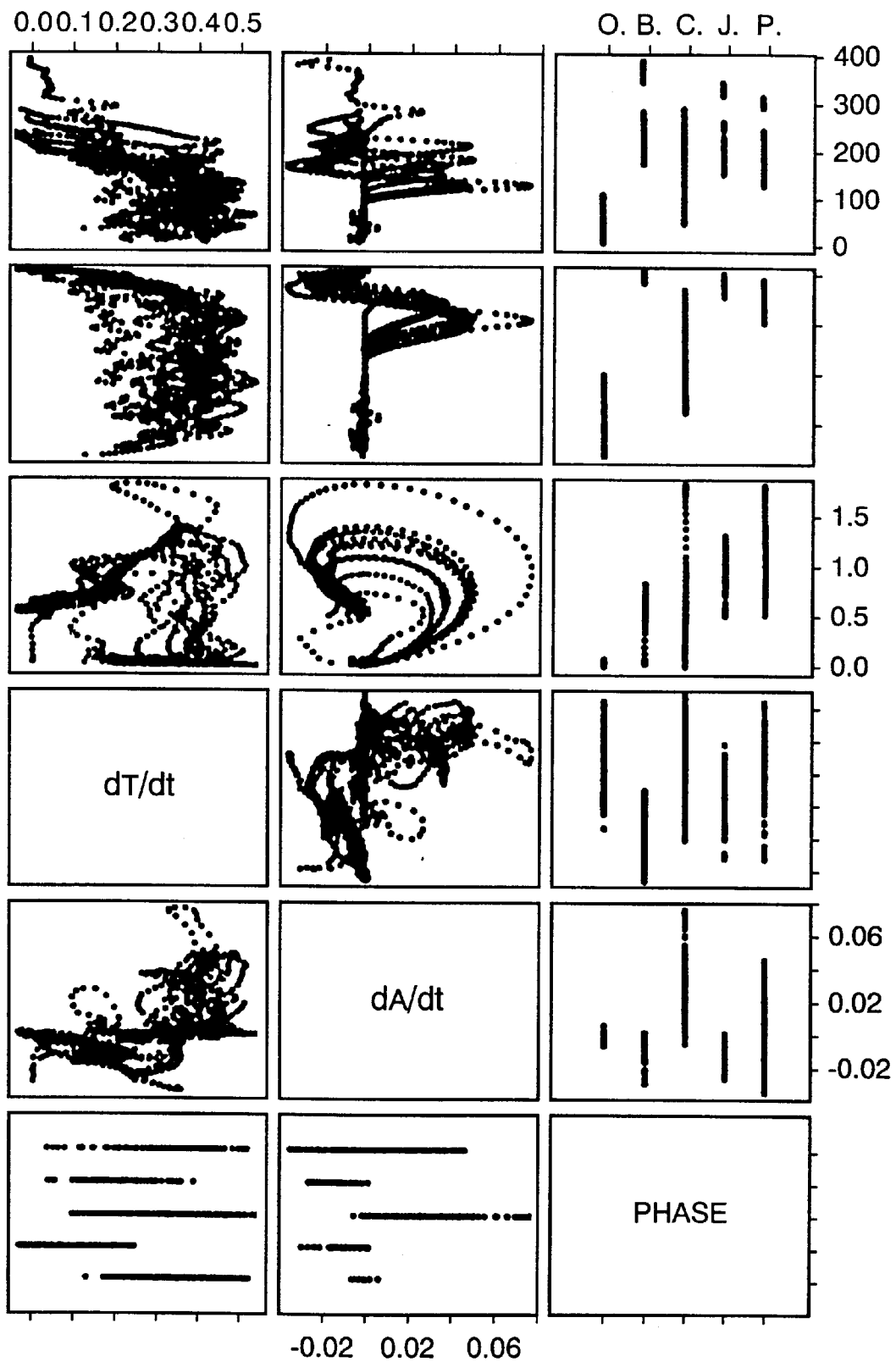
Figure 12:
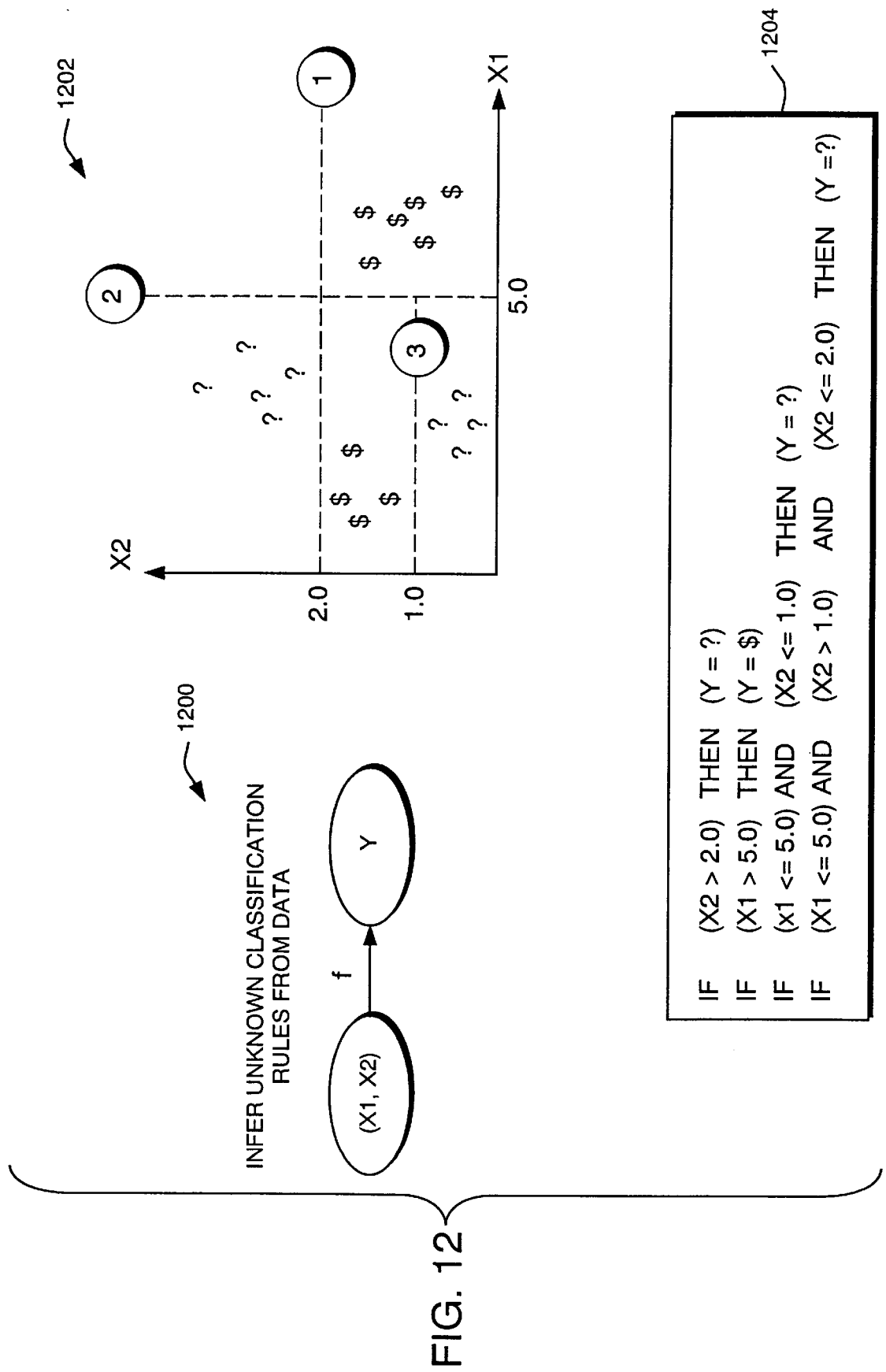
FIG. 12 is a schematic of inductive reasoning for determining boil phase in accordance with the present invention.

FIG. 11 is a matrix plot of various combinations of the time, temperature, acoustic, temperature derivative, acoustic derivative and boil phase parameters. More specifically, the various panels illustrate the possible permutations obtained by plotting each one of these parameters against each other one of these parameters; that is, all permutations of 1×1 parameter plots. In this regard, the horizontal axis is used to plot in series, from left to right: time (column 1); temperature (column 2); acoustic output (column 3); temperature derivative (column 4); acoustic derivative (column 5); and boil phase (column 6). The vertical axis is used to plot in series, from top to bottom: time (row 1); temperature (row 2); acoustic output (row 3); temperature derivative (row 4); acoustic derivative (row 5); and boil phase (row 6). Thus, for example, the panel at column 3, row 1 comprises a plot of time versus acoustic output. The illustrated matrix is useful in identifying features that may be useful for boil phase determination. For example, the panel at the third row of column 2, corresponding to a plot of temperature versus acoustic output, indicates that the acoustic output includes a peak that consistently corresponds to a particular temperature reading. It is therefore anticipated that identification of this acoustic peak may provide an accurate indication of a corresponding boil phase.

A similar process for identifying features that have a relationship to boil phase can be performed automatically using a conventional inductive reasoning tool. The operation of such a tool is illustrated schematically in FIG. 12. The first operation of such an inductive reasoning tool as generally indicated at 1200 involves inferring unknown classification rules from the data. This inference process generally involves receiving a pair-wise set of inputs as indicated by $X_1$, and $X_2$. The inductive reasoning tool then attempts to derive a set of rules or a function (f) that relate the inputs to a target output as identified by y. In the context of the present invention, the inputs may be, for example, temperature and acoustic readings. The desired output is a boil phase determination and the objective is to determine a set of rules (f) relating the input readings to the output boil phase determination.

The plot at 1202 is a graphical example of the operation of the inductive reasoning tool. The graph plots input $X_1$ versus $X_2$. The resulting data points are identified by either question marks or dollar signs corresponding to a desired output value. Although only two output values are shown, in the context of the present invention, four different output values may be desired corresponding to the boil phases of pre-simmer, simmer onset, simmer and boil. The inductive reasoning tool seeks to identify values that can be used to partition or segregate the output values. In the illustrated example, lines 1, 2 and 3 partition the outputs into four sections that each include only one output value. The rules corresponding to lines 1, 2 and 3 are set forth in table 1204. In the same way, the inductive reasoning tool of the present invention is utilized to identify specific values of any input pairs that segregate the outputs according to boil phase. In this regard, the inductive reasoning tool may determine that if the acoustic sensor provides an output of at least x and temperature sensor provides an output of at least y, then the boil phase must be "boil". Due to this ability to "learn", the inductive reasoning tool can be applied with respect to various detected parameters and the accuracy of the tool may be expected to be enhanced with experience.

FIG. 13 includes tables 1300 and 1302 showing a comparison of the boil phase as determined by the boil phase determination method of the present invention versus observed or actual boil phase for a number of test runs. In this regard, table 1300 reflects the results with respect to 825 data points. The rows indicate the actual boil phase where (a) indicates a calm liquid, (b) indicates the pre-simmer phase, (c) indicates the simmer onset phase, (d) indicates the simmer phase and (e) indicates the boil phase. The columns indicate the boil phase as determined in accordance with the present invention using the same labels. It will thus be observed that data points on the diagonal including number 215, number 305, number 78, number 68 and number 133 indicate data points where the boil phase determined in accordance with the present invention matched the actual boil phase. Data points off this diagonal indicate errors. For example, the number 2 at column (d), row (e) indicates two data points where the liquid was actually observed to be in the boil phase but was determined to be in the simmer phase according to the present invention. Despite a relatively small number of errors, it will be observed that the test data indicates that the boil phase was correctly identified by the present invention nearly 97 percent of the time. Table 1302 includes similar information for another 825 data points. In this case, the boil phase was correctly determined by the present invention 91.5 percent of the time.

FIG. 14 is a schematic diagram of a boil phase determination system 1400 in accordance with the present invention utilizing tools as discussed above. The system 1400 includes a range heater 1404 for use in heating a liquid 1402. The sensors 1406, which may include a timer, acoustic sensors, optical sensors and temperature sensors, measure certain parameter values during a heating process. The sensors 1406 in turn provide output readings to a processor 1408. It will be appreciated that various additional components may be interposed between the sensors and the processor for filtering, analog to digital conversion and other functions as discussed above. The processor 1408 is operative for determining a boil phase based on the sensor input information. In this regard, the processor may derive and/or store boil phase relationships 1410, for example, based on the operation of an induction tool. Upon making the boil phase determination, the processor 1408 provides an output indicative of the determined boil phase. In this regard, the output may be used to notify the user of a boil phase such as by sounding an alarm 1412, or providing a visual output. If desired, the system 1400 may be programmed by the user to provide the output upon identification of a defined boil phase, i.e., "sound alarm upon boiling". The boil phase determination may also be used to operate a controller 1414 to thereby control operation of the range heater 1404. For example, upon reaching boiling, the controller may be programmed to reduce the heat or turn off the heater 1404 so as to avoid boil-over or boil-dry.

While various implementations of the present invention have been described in detail, it is apparent that further modifications and adaptations of the invention will occur to those skilled in the art. However, it is to be expressly understood that such modifications and adaptations are within the spirit and scope of the present invention.

What is claimed is:

1. A method for use in determining a boil phase such as during cooking, comprising the steps of:

obtaining sensor reading information regarding a state of a fluid;

invoking inductively derived rules relating sensor reading information to boil phase, said inductively derived rules obtained by performing a plurality of tests involving heating of a test fluid, obtaining test sensor information during said plurality of tests and running an inductive tool to learn relationships between sensor reading information and boil phase;

comparing the obtained sensor reading information of the fluid with the inductively derived rules; and providing an output based on said comparing, wherein said output provides an indication of boil phase based on said inductively derived rules.

2. A method as set forth in claim 1, wherein said step of obtaining sensor reading information comprises receiving a signal from one of a timer, a temperature sensor and an acoustic sensor.

3. A method as set forth in claim 1, wherein said fluid is contained in a container and said step of obtaining sensor reading information comprises detecting a temperature outside of said fluid in said container.

4. A method as set forth in claim 1, further comprising the step of obtaining said inductively derived rules based on tests involving heating a test fluid.

5. A method as set forth in claim 4, wherein said step of obtaining said inductively derived rules comprises performing said tests, obtaining test sensor information during said tests, and deriving said inductively derived rules from said test sensor information.

6. A method as set forth in claim 5, wherein said inductively derived rules is derived from said test sensor information by processing said test sensor information to obtain processed test information and applying an inductive tool to said processed test information to yield said inductively derived rules.

7. A method as set forth in claim 1, wherein said step of providing an output comprises activating an indicator to notify a user of a boil phase determination.

8. A method as set forth in claim 7, wherein said step of activating comprises operating one of a visual indicator and an audible indicator.

9. A method as set forth in claim 1, wherein said step of providing an output comprises outputting a feedback signal for use in controlling a heater element for heating said fluid.

10. An apparatus for use in determining a boil phase such as during cooking, comprising:

a sensor system for sensing a state relative to a fluid under consideration;

a processor storing inductively derived rules for relating sensor output to boil phase, said processor obtaining said inductively derived rules by acquiring a plurality of test information involving heating of a test fluid, running an inductive tool to learn relationships between boil phase and sensor output from said plurality of test information and generating said inductively derived rules therefrom, said processor receiving a signal from said sensor system regarding said system and applying said inductively derived rules to said signal to determine the boil phase;

an output system for providing an output in response to said determined boil phase.

11. An apparatus as set forth in claim 10, wherein said sensor system comprises one of a timer, an acoustic sensor and a temperature sensor.

12. An apparatus as set forth in claim 10, wherein said processor is operative for accessing said stored inductively derived rules and for determining said boil phase.

13. An apparatus as set forth in claim 10, wherein said processor is operative for running an inductive tool to derive a relationship between boil phase and sensor output based on tests performed on at least one test fluid.

14. An apparatus as set forth in claim 10, wherein said output system comprises one of an audible or visual indicator for providing a boil phase indication.

15. An apparatus as set forth in claim 10, wherein said output system comprises a port for outputting a feedback signal responsive to said determined boil phase, wherein said feedback signal can be used to control a heater element for heating said fluid.

16. An apparatus as set forth in claim 10, further comprising a controller for controlling heating of said fluid in response to said output of said output system.

17. A method for determining a boil phase of a fluid, comprising:

obtaining sensor reading information of the fluid;

applying inductively derived rules relating sensor reading information to boil phase to the obtained sensor reading information, said inductively derived rules obtained by performing a plurality of tests involving heating of a test fluid, obtaining test sensor information during said plurality of tests and running an inductive tool to learn relationships between sensor reading information and boil phase;

providing an indication of the boil phase of the fluid according to said inductively derived rules.

18. A method as set forth in claim 17, wherein said obtaining sensor reading information comprises using one of a timer, a temperature sensor and an acoustic sensor.

19. A method as set forth in claim 17, further comprising notifying a user of the boil phase indication.

20. A method as set forth in claim 19, wherein said notifying comprises activating one of a visual indicator and an audible indicator.

21. A method as set forth in claim 17, further comprising outputting a feedback signal to a heater element heating the fluid in accordance with the boil phase indication.

22. An apparatus for determining a boil phase of a fluid, comprising:

a sensor system that senses a state of the fluid; and a processor storing inductively derived rules for relating sensor output to boil phase, said processor obtaining said inductively derived rules by acquiring a plurality of test information involving heating of a test fluid, running an inductive tool to learn relationships between boil phase and sensor output from said plurality of test information and generating said inductively derived rules therefrom, said processor operatively coupled to said sensor system, wherein said processor applies said inductively derived rules to the output of said sensor system to determine the boil phase of the fluid.

23. An apparatus as set forth in claim 22, wherein said sensor system comprises one of a timer, an acoustic sensor and a temperature sensor.

24. An apparatus as set forth in claim 22, further comprising an output system that provides an output indicative of the determined boil phase.

25. An apparatus as set forth in claim 24, wherein said output system comprises one of an audible or visual indicator.

26. An apparatus as set forth in claim 24, wherein said output system comprises a port that outputs a feedback signal to a heater element in response to the determined boil phase.

27. An apparatus as set forth in claim 22, further comprising a controller that controls heating of the fluid in response to the determined boil phase.

* * * * *

UNITED STATES PATENT AND TRADEMARK OFFICE
CERTIFICATE OF CORRECTION

PATENT NO. : 6,301,521 B1
DATED : October 9, 2001
INVENTOR(S) : Yu-To Chen and Pierino Gianni Bonanni It is certified that error appears in the above-identified patent and that said Letters Patent is hereby corrected as shown below:

<u>Title page,</u>
The first-named inventor is shown as: "Yo-To Chen", the correct spelling of the inventor's name is -- Yu-To Chen --

Signed and Sealed this

Twenty-sixth Day of March, 2002

Attest:

JAMES E. ROGAN
*Attesting Officer*     *Director of the United States Patent and Trademark Office*